(12) United States Patent
LaCorre et al.

(10) Patent No.: US 10,865,755 B2
(45) Date of Patent: Dec. 15, 2020

(54) SOLENOID-ACTUATED VALVE AND HYDRAULIC CONTROL MODULE INCLUDING THE SAME

(71) Applicant: BorgWarner Inc., Auburn Hills, MI (US)

(72) Inventors: Jean-Louis LaCorre, Gimel les Cascades (FR); Thierry Mollard, Favars (FR); Jeffrey J. Waterstredt, Royal Oak, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/282,490

(22) Filed: Feb. 22, 2019

(65) Prior Publication Data

US 2019/0264644 A1 Aug. 29, 2019

Related U.S. Application Data

(60) Provisional application No. 62/635,781, filed on Feb. 27, 2018.

(51) Int. Cl.
*F02M 63/00* (2006.01)
*F16K 31/06* (2006.01)
*F16K 39/04* (2006.01)

(52) U.S. Cl.
CPC ......... *F02M 63/0015* (2013.01); *F16K 31/06* (2013.01); *F16K 39/04* (2013.01)

(58) Field of Classification Search
CPC ...... F02M 63/0015; F16K 31/06; F16K 39/04
See application file for complete search history.

(56) References Cited

U.S. PATENT DOCUMENTS

| 3,732,893 | A | * | 5/1973 | Ziesche | F16K 31/0627 |
|---|---|---|---|---|---|
|  |  |  |  |  | 137/625.65 |
| 4,002,318 | A |  | 1/1977 | Von Koch |  |
| 4,988,074 | A |  | 1/1991 | Najmolhoda |  |

(Continued)

FOREIGN PATENT DOCUMENTS

WO 2007090847 A1 8/2007

OTHER PUBLICATIONS

English language abstract and machine-assisted English translation for WO 2007/090847 extracted from espacenet.com database on Mar. 28, 2019, 13 pages.

*Primary Examiner* — Kevin R Barss
(74) *Attorney, Agent, or Firm* — Howard & Howard Attorneys PLLC

(57) ABSTRACT

A solenoid-actuated valve includes a solenoid portion extending along a longitudinal axis. The solenoid portion includes a solenoid housing defining a solenoid interior, a coil, and an armature, with the armature being moveable along the longitudinal axis in response to energization of the coil. The solenoid-actuated valve also includes a valve portion coupled to the solenoid portion. The valve portion includes a valve member moveable by the armature. The solenoid-actuated valve further includes a valve filter disposed in the solenoid interior and/or coupled to the solenoid housing and configured to separate the solenoid interior from a hydraulic circuit when the valve portion is coupled to a valve housing for allowing fluid to flow into and out of the solenoid interior upon actuation of the armature.

23 Claims, 12 Drawing Sheets

(56) References Cited

U.S. PATENT DOCUMENTS

| | | | |
|---|---|---|---|
| 7,303,214 B2 * | 12/2007 | Bayer | F02M 51/0667 |
| | | | 285/328 |
| 7,325,566 B2 * | 2/2008 | Marcichow | F16K 31/06 |
| | | | 137/549 |
| 9,163,745 B2 * | 10/2015 | Murakami | F16K 31/06 |
| 9,556,968 B2 * | 1/2017 | Mayr | H01F 7/06 |
| 9,631,735 B2 | 4/2017 | Peterson et al. | |
| 9,670,879 B2 * | 6/2017 | Nakano | F16K 31/0662 |
| 10,267,283 B2 * | 4/2019 | Yasukawa | F02M 51/06 |

* cited by examiner

SOLENOID-ACTUATED VALVE AND HYDRAULIC CONTROL MODULE INCLUDING THE SAME

CROSS-REFERENCE TO RELATED APPLICATIONS

This subject patent application claims priority to and all the benefits of U.S. Provisional Patent Application No. 62/635,781 filed on Feb. 27, 2018, which is herein incorporated by reference in its entirety.

BACKGROUND OF THE INVENTION

1. Field of the Invention

The present invention relates generally a hydraulic control module for use in a transmission of a motor vehicle and, more specifically, to solenoid-actuated valve for use in a hydraulic control module.

2. Description of the Related Art

Conventional vehicle powertrain systems known in the art typically include an engine in rotational communication with a transmission. The engine generates rotational torque which is selectively translated to the transmission which, in turn, translates rotational torque to one or more wheels. Typical transmissions are shifted in discrete steps between a high-torque, low-speed mode for starting a vehicle and a high-speed, low-torque mode for vehicle operation at highway speeds. In a manual transmission, shifting is accomplished by the manual controlled engagement of gear sets. In an automatic transmission, shifting is accomplished by the automatic controlled engagement of friction elements.

To control shifting in the automatic transmission, a hydraulic control module includes a valve body coupled to a transmission housing of the automatic transmission, with the valve body defining a hydraulic circuit. Hydraulic fluid flowing in the hydraulic circuit facilitates shifting and controlled engagement of the friction elements.

To facilitate shifting and controlled engagement of the friction elements of the automatic transmission, the hydraulic control assembly typically includes a pump to provide pressurized hydraulic fluid, and a plurality of valves for controlling the flow of hydraulic fluid through the hydraulic circuit. In recent years, such automatic transmissions have used various electronic elements, such as solenoid-actuated valves, to control the flow of hydraulic fluid through the hydraulic circuit.

Conventional solenoid-actuated valves used to control the plurality of valves for controlling the flow of hydraulic fluid through the hydraulic circuit include a solenoid portion and a valve portion. The solenoid portion of the typical solenoid-actuated valve includes a solenoid housing defining a solenoid interior, a coil disposed in the solenoid interior, and an armature disposed in the coil that is moveable upon energization of the coil. The valve portion of the typical solenoid-actuated valve has a valve body defining a valve interior, and a valve member disposed in the valve interior. To control the flow of hydraulic fluid using the typical solenoid-actuated valve, the cylindrical coil is energized, which moves the armature and, in turn, the valve member in the valve interior.

During movement of the armature when the coil is energized, an internal volume defined in the solenoid interior changes upon actuation of the armature. As a result of the change in the internal volume of the solenoid interior, conventional solenoid-actuated valves provide a vent, which allows fluid to enter and leave the solenoid portion as the internal volume of the solenoid interior is changed upon actuation of the armature.

In certain environments, especially when the solenoid-actuated valve is submerged in hydraulic fluid carrying contaminates, such as wear metals, there is a desire to keep the contaminates out of the solenoid interior of the solenoid-actuated valve. To prevent contaminates in the hydraulic fluid from entering the solenoid interior, the vents provided by conventional solenoid-actuated valves have a tortuous path, which slows the ingress of the contaminates, as the hydraulic fluid carrying the contaminates must flow along the tortuous path to reach the solenoid interior. However, over time and after repeated actuation of the armature, the contaminates carried by the hydraulic fluid eventually ingress into the solenoid interior, which degrades performance of the solenoid-actuated valve by damaging various components of the solenoid portion, such as bearings and magnetic components. Additionally, the contaminates in the solenoid interior increases hysteresis, and negatively impact performance and accuracy of the valve member due to accumulation of the contaminates by changing the transfer function of the solenoid-actuated valve.

As such, there remains a need to provide an improved solenoid-actuated valve.

SUMMARY OF THE INVENTION AND ADVANTAGES

A solenoid-actuated valve includes a solenoid portion extending along a longitudinal axis. The solenoid portion includes a solenoid housing disposed about the longitudinal axis and defining a solenoid interior, a coil disposed about the longitudinal axis and in the solenoid interior, and an armature disposed about the longitudinal axis and in the solenoid interior and between the longitudinal axis and the coil. The armature is moveable along the longitudinal axis in response to energization of the coil. The solenoid-actuated valve also includes a valve portion coupled to the solenoid portion. The valve portion includes a valve member moveable by said armature for controlling a flow of hydraulic fluid. The solenoid-actuated valve further includes a valve filter disposed in the solenoid interior and/or coupled to the solenoid housing and configured to separate the solenoid interior from a hydraulic circuit when the valve portion is coupled to a valve housing for allowing fluid to flow into and out of the solenoid interior upon actuation of the armature.

Accordingly, the valve filter of the solenoid-actuated valve disposed in the solenoid interior and/or coupled to the solenoid housing and configured to separate the solenoid interior from a hydraulic circuit when the valve portion is coupled to a valve housing prevents contaminates carried by the hydraulic fluid from entering the solenoid interior defined by the solenoid housing. Specifically, the valve filter prevents the contaminates carried by the hydraulic fluid from entering into the solenoid portion of the solenoid-actuated valve over time and after repeated actuation of the armature, which allows the solenoid-actuated valve to maintain performance, as the contaminates carried by the hydraulic fluid are unable to ingress into the solenoid interior and damage components of the solenoid portion. Additionally, the valve filter improves control of the armature during actuation, as the hydraulic fluid is able freely flow into and out of the solenoid interior as an internal volume of the solenoid interior changes, which reduces a force applied to the armature from the hydraulic fluid upon actuation of the armature.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
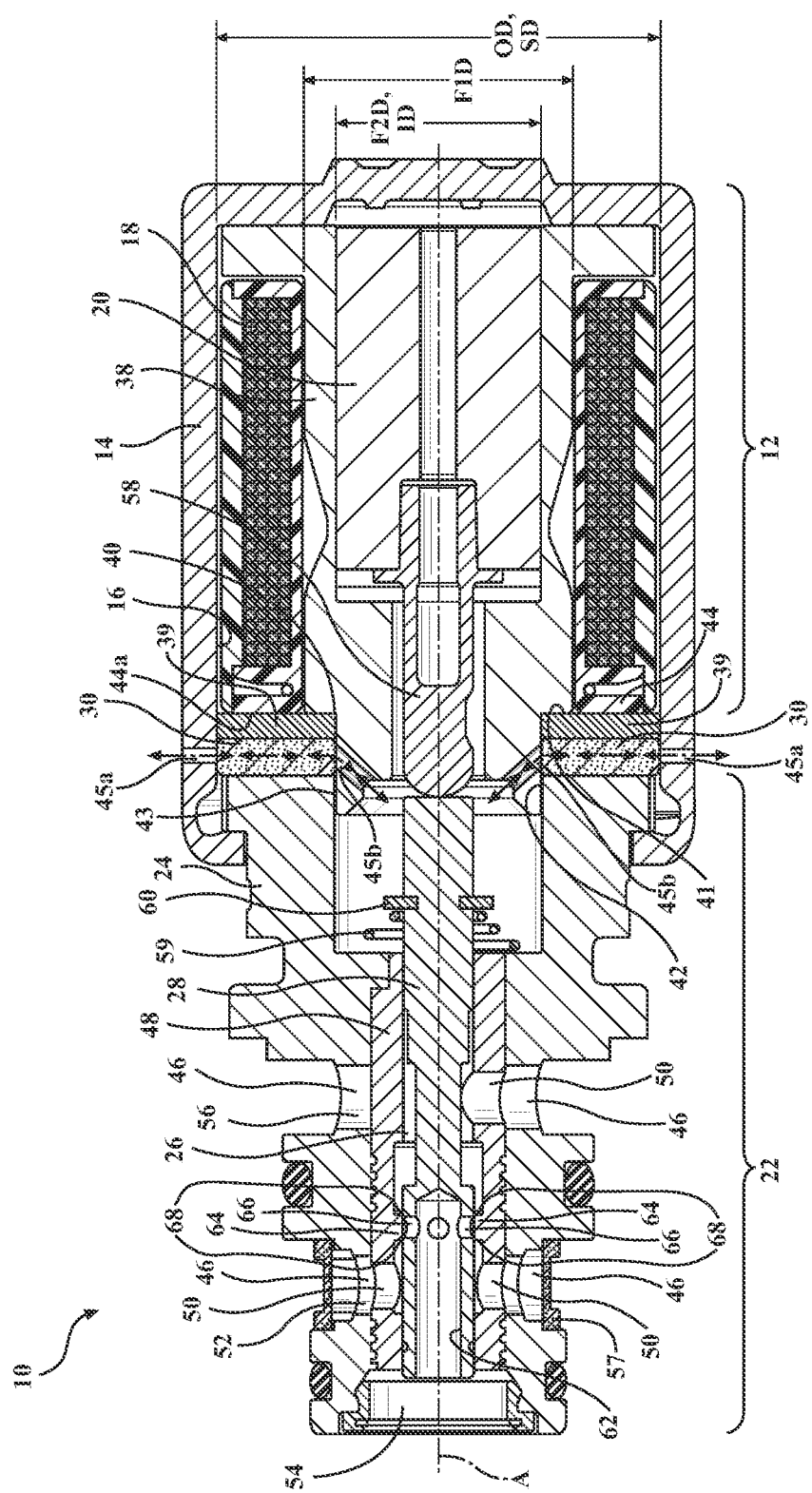
FIG. 1 is a cross-sectional view of a solenoid-actuated valve including: a solenoid portion having a solenoid housing, a coil, and an armature; a valve portion coupled to the solenoid portion, with the valve portion having a valve body and a valve member; and a valve filter disposed in the solenoid interior and coupled to the solenoid housing.

With reference to the Figures, wherein like numerals indicate like parts throughout the several views, a solenoid-actuated valve 10 is shown in a cross-sectional view in FIG. 1. The solenoid-actuated valve 10 includes a solenoid portion 12 extending along a longitudinal axis A. The solenoid portion 12 includes a solenoid housing 14 disposed about the longitudinal axis A and defining a solenoid interior 16. The solenoid portion 12 also includes a coil 18 disposed about the longitudinal axis A and in the solenoid interior 16. The solenoid portion 12 further includes an armature 20 disposed about the longitudinal axis A and in the solenoid interior 16 and between the longitudinal axis A and the coil 18. The armature 20 is moveable along the longitudinal axis A in response to energization of the coil 18.

The solenoid-actuated valve 10 also includes a valve portion 22 coupled to the solenoid portion 12. The valve portion 22 includes a valve member 28 moveable by the armature 20 for controlling a flow of hydraulic fluid, as described in further detail below. The valve portion 22 may include a valve body 24 disposed about the longitudinal axis A and defining a fluid passage 26. When present, the valve body 24 is typically coupled to the solenoid housing 12. In some embodiments, the valve body 24 is directly engaged with the solenoid housing 12.

When the valve body 24 is present, the valve member 28 may be disposed in the fluid passage 26 for controlling the flow of hydraulic fluid. Typically, the fluid passage 26 and the solenoid interior 16 are not fluidly coupled to one another. In other words, the hydraulic fluid is restricted from flowing directly from the fluid passage 26 to the solenoid interior 16, and from the solenoid interior 16 to the fluid passage 26. It is to be appreciated that the solenoid interior 16 may be collectively defined by the solenoid housing 12 and the valve body 24. In such embodiments, the solenoid interior 16 is not fluidly coupled to the fluid passage 26 such that the hydraulic fluid is restricted from flowing directly from the fluid passage 26 to the solenoid interior 16.

The solenoid-actuated valve 10 also includes a valve filter 30 disposed in the solenoid interior 16 and/or coupled to the solenoid housing 14. The valve filter 30 is configured to separate the solenoid interior 16 from a hydraulic circuit when the valve portion 22 is coupled to a valve housing for allowing fluid to flow into and out of the solenoid interior 16 upon actuation of the armature 20, as described in further detail below.

Figure 2:
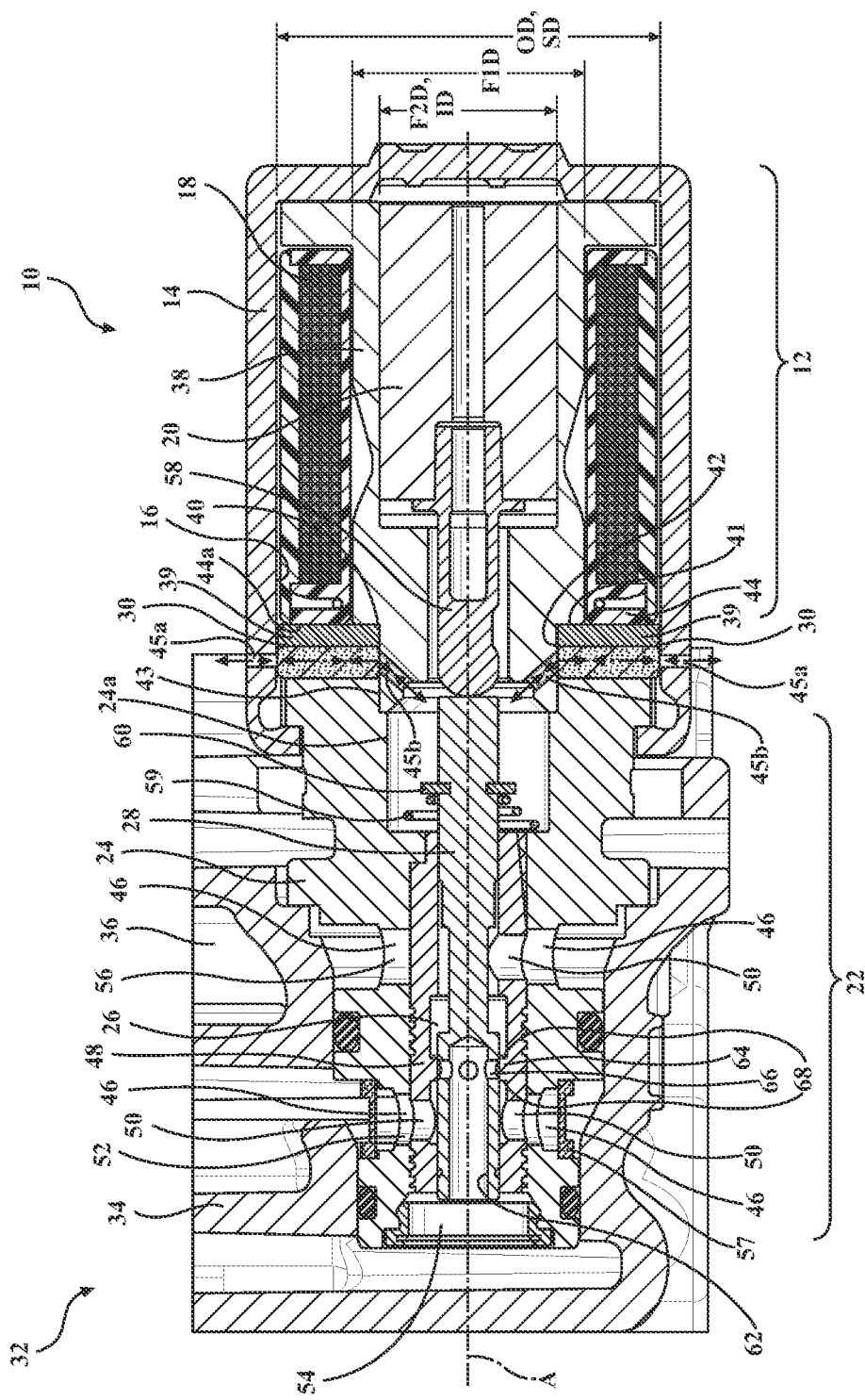
FIG. 2 is a cross-sectional view of a hydraulic control module including a valve housing defining a hydraulic circuit, and the solenoid-actuated valve of FIG. 1.
Figure 10:
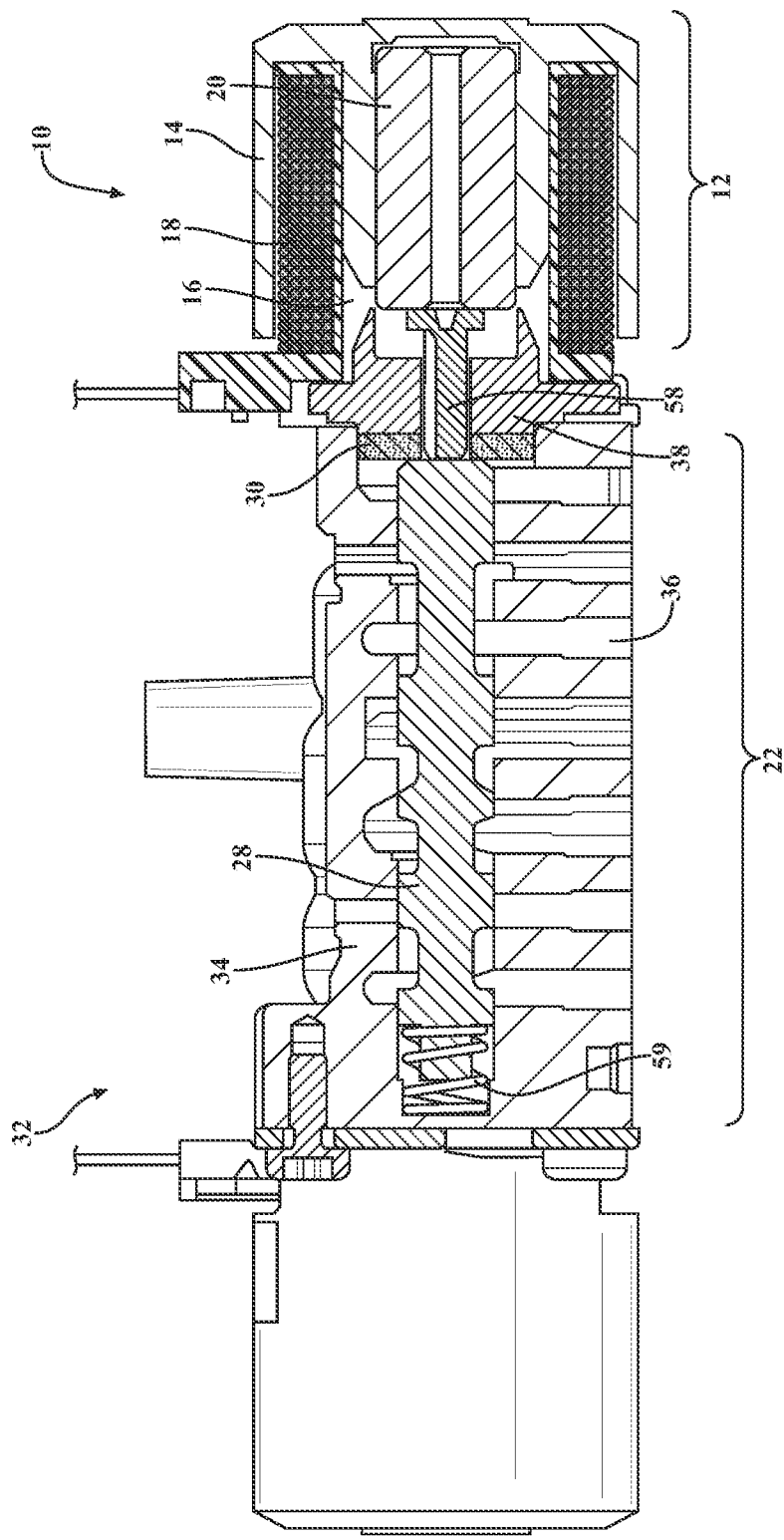
FIG. 10 is a cross-sectional view of the hydraulic control module including another embodiment of the solenoid-actuated valve with the valve body being removed and the valve filter coupled to the flux core and the valve housing.
Figure 11:
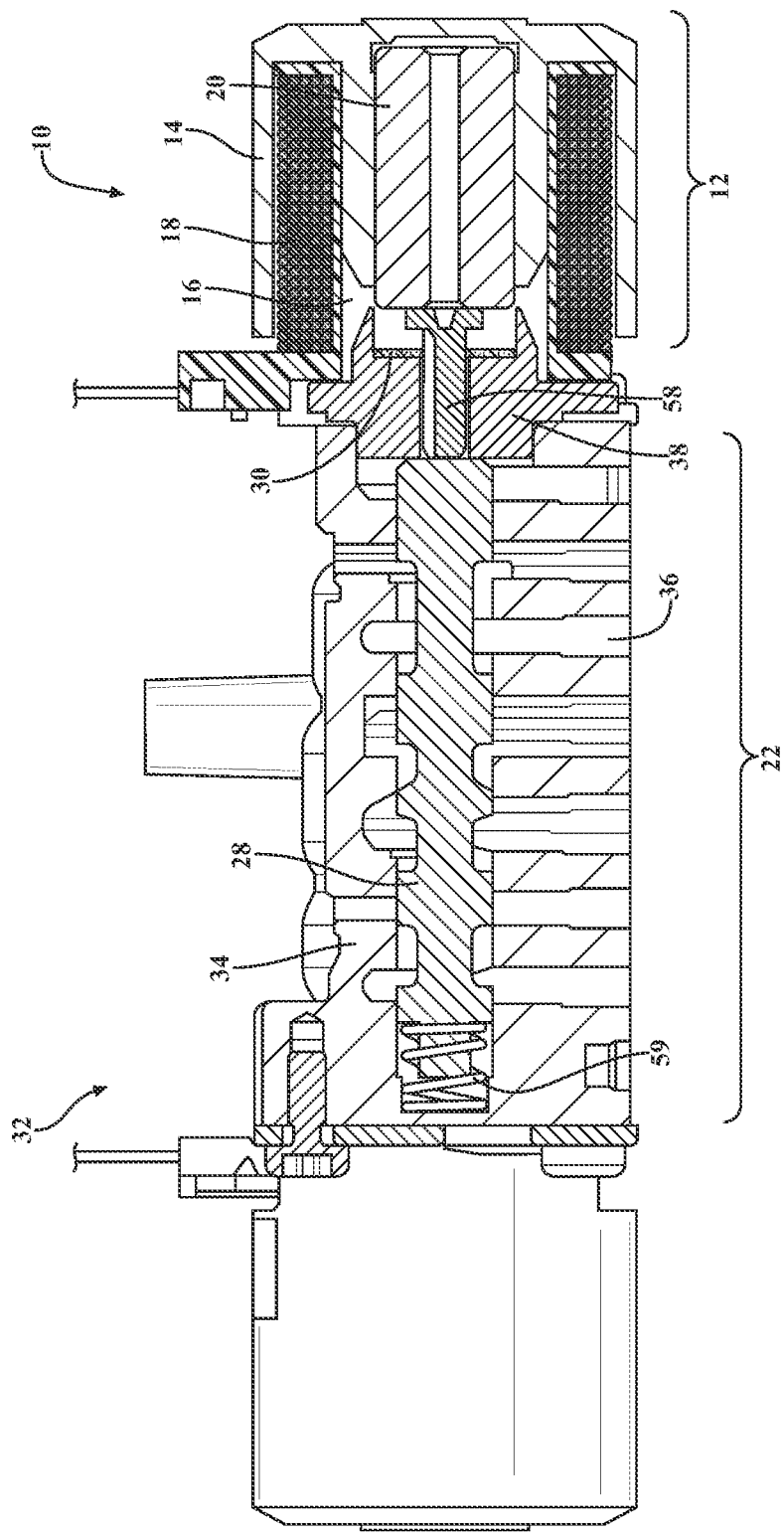
FIG. 11 is a cross-sectional view of the hydraulic control module of FIG. 10, with the valve filter coupled to the flux core.
Figure 12:
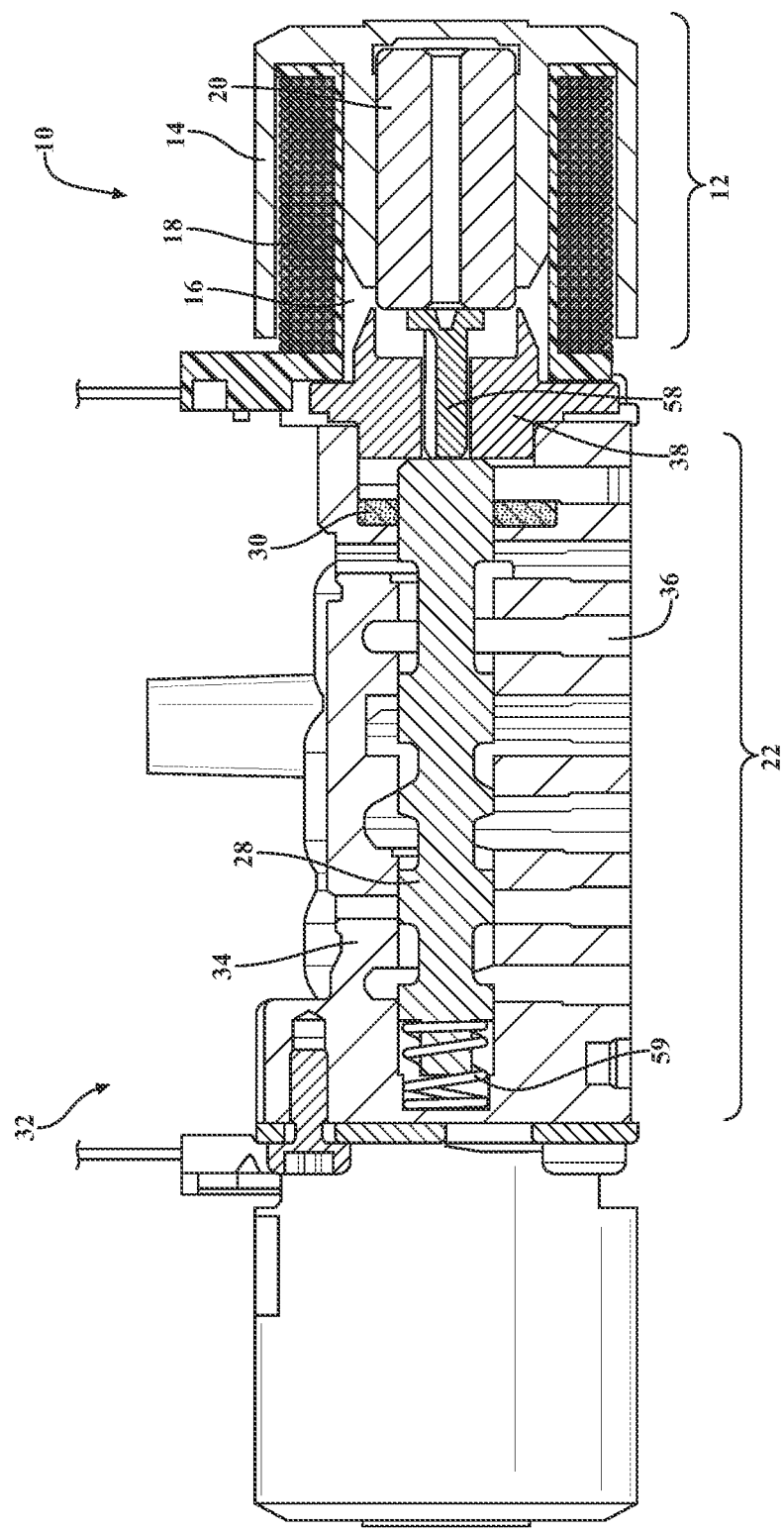
FIG. 12 is a cross-sectional view of the hydraulic control module of FIG. 10, with the valve filter being coupled to the valve housing.

With reference to FIG. 2, the solenoid-actuated valve 10 may be used in a hydraulic control module 32. The hydraulic control module 32 includes the solenoid-actuated valve 10 and a valve housing 34. The valve housing 34 defines a hydraulic circuit 36. When the solenoid-actuated valve 10 is used in the hydraulic control module 32, the solenoid-actuated valve 10 controls a flow of hydraulic fluid through the hydraulic circuit 36 defined by the valve housing 34. Specifically, movement of the armature 20 and, in turn, the valve member 28 controls the flow of hydraulic fluid through the hydraulic circuit 36. It is to be appreciated that the valve member 28 may be disposed in the hydraulic circuit 36 with the valve portion 22 including the valve body 24, as shown in FIG. 2, or with the valve portion 22 not including the valve body 24, as shown in FIGS. 10-12. With further reference to FIGS. 10-12, the valve filter 30 may be coupled to the flux core 38 and the valve housing 34, as shown in FIG. 10. In some embodiments, the valve filter 30 is directly engaged with the flux core 38 and the valve housing 34. Typically, in this embodiment, the valve filter 30 may be in sliding engagement with the pin 58 such that the pin 58 slides with respect to the valve filter 30, with the valve filter 30 allowing hydraulic fluid to flow through the valve filter 30 during actuation of the armature 20. With reference to FIG. 11, the valve filter 30 may be coupled to the flux core 38. In some embodiments, the valve filter 30 is directly engaged with the flux core 38. Typically, in this embodiment, the valve filter 30 may be in sliding engagement with the pin 58 such that the pin 58 slides with respect to the valve filter 30, with the valve filter 30 allowing hydraulic fluid to flow through the valve filter 30 during actuation of the armature 20. With reference to FIG. 12, the valve filter 30 may be coupled to the valve housing 34. In some embodiments, the valve filter 30 is directly engaged with the valve housing. Typically, in this embodiment, the valve filter 30 may be in sliding engagement with the valve member 28 such that the valve member 28 slides with respect to the valve filter 30, with the valve filter 30 allowing hydraulic fluid to flow through the valve filter 30 during actuation of the armature 20.

Additionally, when the solenoid-actuated valve 10 is used in the hydraulic control module 32, the valve filter 30 is configured to separate the solenoid interior 16 from the hydraulic circuit for allowing fluid to flow into and out of the solenoid interior 16 upon actuation of the armature 20. Typically, the hydraulic control module 32 is used with a transmission of a motor vehicle for controlling the transmission.

The valve filter 30 of the solenoid-actuated valve 10 prevents contaminates in the hydraulic fluid from entering the solenoid portion 12. Specifically, the valve filter 30 prevents contaminates in the hydraulic fluid from entering the solenoid portion 12 of the solenoid-actuated valve 10 over time and after repeated actuation of the armature 20, which allows the solenoid-actuated valve 10 to maintain performance, as the contaminates carried by the hydraulic fluid are unable to ingress into the solenoid portion 12 and damage various components of the solenoid portion 12. For example, the contaminates, such as metal shavings, carried by the hydraulic fluid can negatively affect performance of the solenoid-actuated valve 10, as contaminates can degrade the coil 18, the armature 20, and bearings in the solenoid interior 16. Additionally, reducing or eliminating the contaminates in the solenoid interior 16 decreases hysteresis, and increases accuracy of the armature 20, because of the reduction or elimination of build-up of the contaminates, which reduces or eliminates mud accumulation in the solenoid interior 16. Additionally, the valve filter 30 improves control of the armature 20 and, in turn, the valve member 28, during actuation, as the hydraulic fluid is able freely flow into and out of the solenoid interior 16 as a volume of the solenoid interior 16 changes during movement of the armature 20. Allowing the hydraulic fluid to freely flow into and out of the solenoid interior 16 reduces any external force applied to the armature 20 from the hydraulic fluid during actuation of the armature 20. In addition to the hydraulic fluid flowing into and out of the solenoid interior 16, air may also flow into and out of the solenoid interior 16, which is able to pass through the valve filter 30.

When the solenoid-actuated valve 10 is used in the hydraulic control module 32, the valve filter 30 prevents the contaminates in the hydraulic fluid in the hydraulic circuit 36 from entering the solenoid portion 12 of the solenoid-actuated valve 10 over time and after repeated actuation of the armature 20. As such, the valve filter 30 allows the solenoid-actuated valve 10 to maintain performance, as the contaminates carried by the hydraulic fluid are unable to ingress into the solenoid portion 12 and damage various components of the solenoid portion 12. Additionally, the valve filter 30 improves control of the armature 20 and, in turn, the valve member 28, during actuation, because the hydraulic fluid is able freely flow into and out of the solenoid interior 16 as the volume of the solenoid interior 16 changes during movement of the armature 20 and because the valve filter 30 keeps the contaminates from entering into the solenoid interior 16. Allowing the hydraulic fluid to freely flow into and out of the solenoid interior 16 reduces any external force applied to the armature 20 from the hydraulic fluid during actuation of the armature 20. Additionally, allowing the hydraulic fluid to freely flow into and out of the solenoid interior 16, specifically between the solenoid portion 12 and the valve portion 22, improves performance over other solenoid-actuated valves that do not allow the hydraulic fluid to flow freely into and out of the solenoid interior. In other words, the solenoid interior 16 of the solenoid portion 12 is fluidly coupled to the hydraulic circuit 36 defined by the valve housing 34, which, as described above, improves performance of the solenoid-actuated valve 10.

The valve filter 30 may be directly engaged with the solenoid housing 14. In one embodiment, as shown in FIGS. 1-5, the valve filter 30 may be disposed between the valve portion 22 and the solenoid portion 12.

In one embodiment, the valve filter 30 is stationary with respect to the solenoid housing 14 upon actuation of the armature 20. Having the valve filter 30 stationary with respect to the solenoid housing 14 upon actuation of the armature 20 reduces additional friction and hysteresis of the armature 20. Said differently, because the valve filter 30 does not move axially along the longitudinal axis A upon actuation of the armature 20, additional friction of the valve filter 30 acting against various components of the solenoid portion 12 is eliminated, which eliminates any hysteresis caused from the additional friction. As such, control of the valve member 28 and, in turn, the hydraulic fluid flowing through the valve portion 22 of the solenoid-actuated valve 10 is improved. The valve filter 30 may be press-fit between the solenoid portion 12 and the valve portion 22. It is to be appreciated that the valve filter 30 may be secured between the solenoid portion 12 and the valve portion 22 through any other suitable way, such as using fasteners or adhesive. The valve filter 30 may be disposed 360 degrees about the longitudinal axis A. Having the valve filter 30 disposed 360 degrees about the longitudinal axis A allows maximum flow of fluid into and out of the solenoid interior 16 upon actuation of the armature 20.

The valve filter 30 may be comprised of any suitable material that keeps contaminates out of the solenoid portion 12, but still allows fluid to flow into and out of the solenoid interior 16 upon actuation of the armature 20, such as through pores defined by the material of the valve filter 30. For example, the valve filter 30 may be a felt filter. In other embodiments, the valve filter 30 may be comprised of a porous ceramic material, a metallic material, or a fibrous material, such as paper. In other embodiments, the valve filter 30 may be comprised of a metallic material. In some embodiments, the valve filter 30 has a pore size less than 30 micrometers. Having the pore size of the valve filter 30 less than 30 micrometers allows fluid to flow freely into and out of the solenoid interior 16 upon actuation of the armature 20, all while preventing contaminates from flowing into the interior of the solenoid interior 16. In other embodiments, the valve filter 30 has a pore size less than 25 micrometers. In other embodiments, the valve filter 30 has a pore size less than 20 micrometers. In other embodiments, the valve filter 30 has a pore size less than 15 micrometers. In other embodiments, the valve filter 30 has a pore size of about 10 micrometers. The pores defined by the valve filter 30 may be formed by a laser.

The solenoid portion 12 may further include a flux core 38 disposed in the solenoid interior 16 about the longitudinal axis A. The valve filter 30 may be disposed between the flux core 38 and the valve body 24. The flux core 38 may define a corner 40, with the valve filter 30 being disposed in the corner 40 and such that the valve filter 30 is disposed between the valve body 24 and the flux core 38. In other words, the valve filter 30 may be nested in the corner 40 defined by the flux core 38. When present, the corner 40 prevents the valve filter 30 from moving with respect to the longitudinal axis A, as the corner 40 defined by the flux core 38 restricts movement perpendicular to the longitudinal axis A, and prevents movement along the longitudinal axis A due to the valve filter 30 being sandwiched between the valve body 24 and the flux core 38.

In some embodiments, as best shown in FIG. 1, the corner 40 is defined by a first and second flux sides 41, 42. The first flux side 41 may have a first flux diameter F1D defined perpendicular to the longitudinal axis A, and the second flux side 42 may have a second flux diameter F2D defined perpendicular to the longitudinal axis A. In one embodiment, the first flux diameter F1D is greater than the second flux diameter F2D. In this embodiment, the first flux diameter F1D of the first flux side 41 being greater than the second flux diameter F2D of the second flux side 42 defines the corner 40. In some embodiments where the flux core 38 defines the corner 40, the valve body 24 and the flux core 38 collectively define a pocket 43 about the longitudinal axis A for securing the valve filter 30. Specifically, in such embodiments where the flux core 38 and the valve body 24 collectively define the pocket 43, the pocket 43 may be defined by the first flux side 41, second flux side 42, and the valve body 24. In such embodiments, as described above, the valve filter 30 may be press-fit between the flux core 38 and the valve body 24.

The valve filter 30 may have a filter outer diameter OD defined perpendicular to the longitudinal axis A, and may have a filter inner diameter ID defined perpendicular to the longitudinal axis A. The filter inner diameter ID may be equal to the second flux diameter F2D. In such embodiments, the valve filter 30 may be directly engaged with the flux core 38 and disposed in the corner 40.

The solenoid portion 12 of the solenoid-actuated valve 10 may include a coil housing 44 disposed in the solenoid interior 16. The coil housing 44 may be disposed about the coil 18 such that the coil housing 44 surrounds the coil 18. In one embodiment, the valve filter 30 is disposed between and coupled to the coil housing 44 and the valve body 24. In other embodiments, the solenoid portion 12 includes a washer 39 disposed in the solenoid interior 16 and about the longitudinal axis A, and coupled to the solenoid housing 44 and the flux core 38. In some embodiments, the filter 30 is coupled to the washer 39. Typically, the washer 39 is comprised of a magnetic material and is directly engaged with the coil housing 44 and the flux core 38 to complete a magnetic flux circuit around the coil 18. The valve filter 30 may be directly engaged with the washer 39, the flux core 38, and the valve body 24. The washer 39 may be disposed in the corner 40 and between the valve filter 30 and the coil housing 44. When the washer 39 is disposed in the corner 40, the washer 39 may be disposed in the pocket 43 defined by the valve body 24 and the flux core 38.

In another embodiment, the pocket 43 may be defined by the flux core 38, the valve body 24, and the coil housing 44. In this embodiment, the pocket 43 may be defined further by the first flux side 41, the second flux side 42, the valve body 24, and the coil housing 44. In such embodiments, the valve filter 30 may be directly engaged with the first flux side 41, the second flux side 42, the valve body 24, and the coil housing 44. The coil housing 44 may have a coil housing face 44a that is flush with the first flux side 41 with respect to the longitudinal axis A. When the portion of the coil housing 44 adjacent the valve filter 30 and the first flux side 41 is flush with the first flux side 41, the valve filter 30 may be directly engaged with both the flux core 38 and the coil housing 44. Specifically, the valve filter 30 may be directly engaged with both the first flux side 41 and the coil housing face 44. When the solenoid-actuated valve 10 includes the washer 39, the pocket 43 may be defined by the flux core 38, the valve body 24, and the washer 39.

The solenoid housing 14 may define an interior solenoid diameter D1 perpendicular to the longitudinal axis A. The filter outer diameter OD may be equal to the interior solenoid diameter D1. When the filter outer diameter OD is equal to the interior solenoid diameter D1, the valve filter 30 prevents the contaminates carried by the hydraulic fluid from entering into the solenoid interior 16 between the solenoid housing 14 and the valve filter 30.

The valve body 24 may define a housing fluid passage 45a for directing hydraulic fluid to flow into and out of the solenoid interior 16 upon actuation of the armature 20. When present, the housing fluid passage 45a is fluidly coupled to the solenoid interior 16, as fluid is able to move into and out of the solenoid interior 16, through the valve filter 30, and through the housing fluid passage 45a.

Figure 6:
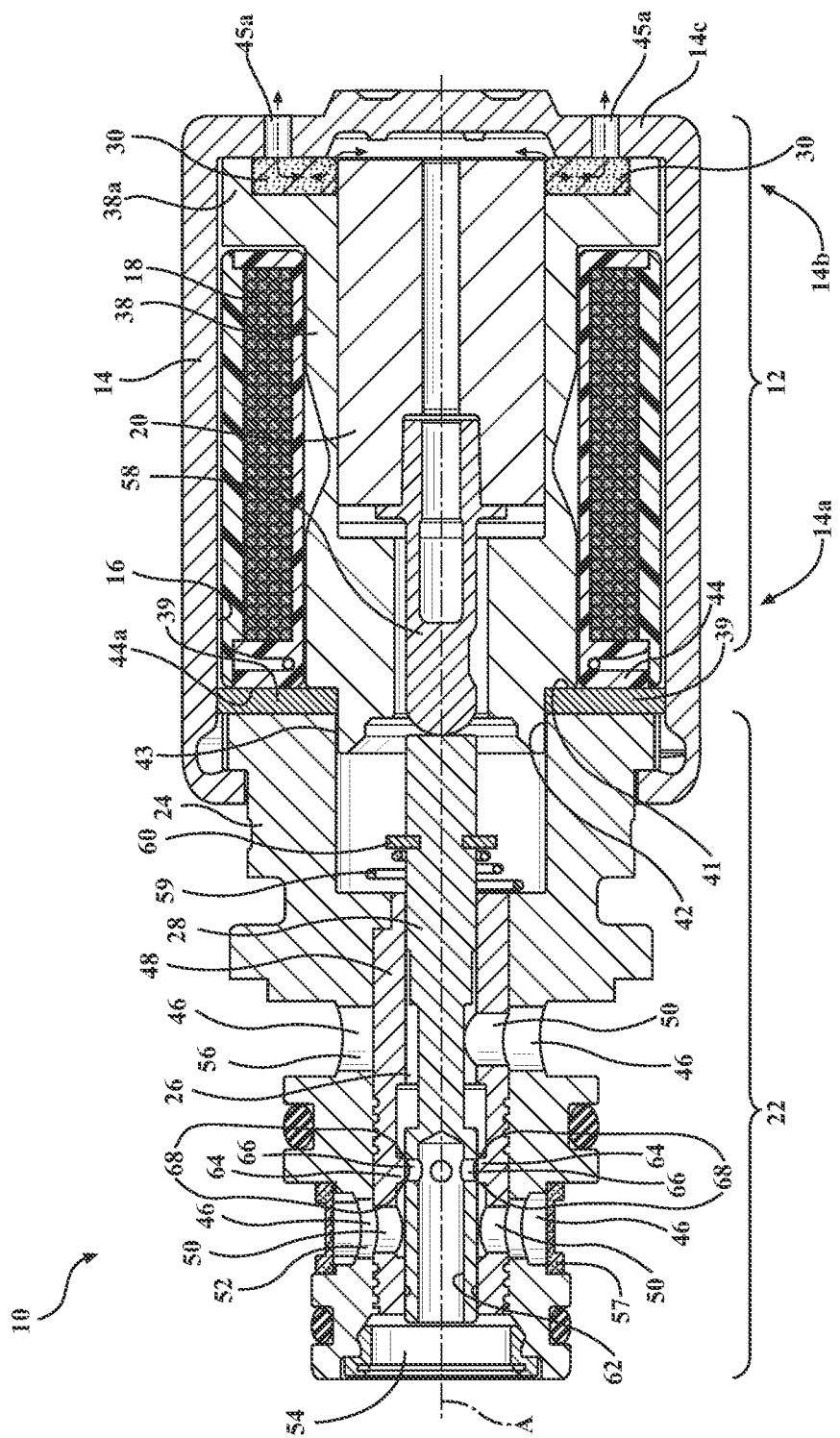
FIG. 6 is a cross-sectional view of another embodiment of the solenoid-actuated valve, with the solenoid housing having a first housing end and a second housing end, with the housing fluid passage being defined at the second housing end.

The solenoid housing 14 may have a first housing end 14a adjacent the valve body 24, and a second housing end 14b spaced from the first housing end 14a along the longitudinal axis A. In one embodiment, as shown in FIGS. 1-4, the housing fluid passage 45a is defined at the first housing end 14a. The housing fluid passage 45a may be defined through the solenoid housing 14 perpendicular to the longitudinal axis A such that the hydraulic fluid flows into and out of the solenoid interior 16 perpendicular to the longitudinal axis A. It is to be appreciated that the housing fluid passage 45a may be defined through the solenoid housing 14 at any angle relative to the longitudinal axis A, such as 45 degrees, such that the hydraulic fluid flows into and out of the solenoid interior 16. The housing fluid passage 45a may be disposed between the coil 18 and the valve body 24 with respect to longitudinal axis A. Specifically, the housing fluid passage 45a may be disposed between the coil housing 44 and the valve body 24 with respect to longitudinal axis A. In another embodiment, as shown in FIG. 6, the housing fluid passage 45a is defined at the second housing end 14b. In this embodiment, the housing fluid passage 45a may be defined parallel to the longitudinal axis A such that the hydraulic fluid flows into and out of the solenoid interior 16 parallel to the longitudinal axis A. It is to be appreciated that the housing fluid passage 45a may be defined through the solenoid housing 14 at any angle relative to the longitudinal axis A, such as 45 degrees, such that the hydraulic fluid flows into and out of the solenoid interior 16. The solenoid housing 14 may have a solenoid base 14c, with the housing fluid passage 45a defined through the solenoid base 14c. As shown in FIG. 6, the valve filter 30 is disposed at the second solenoid end 14b, and is coupled to the flux core 38 and the solenoid housing 14. Specifically, the valve filter 30 is coupled to the flux core 38 and the solenoid base 14c. In one embodiment, the valve filter 30 is sandwiched between and directly engaged with the flux core 38 and the solenoid housing 14. It is to be appreciated that the housing fluid passage 45*a* defined at the second housing end 14*b* and the valve filter 30 may be disposed at the second solenoid end 14*b* in embodiments where the valve body 24 is not present.

Figure 3:
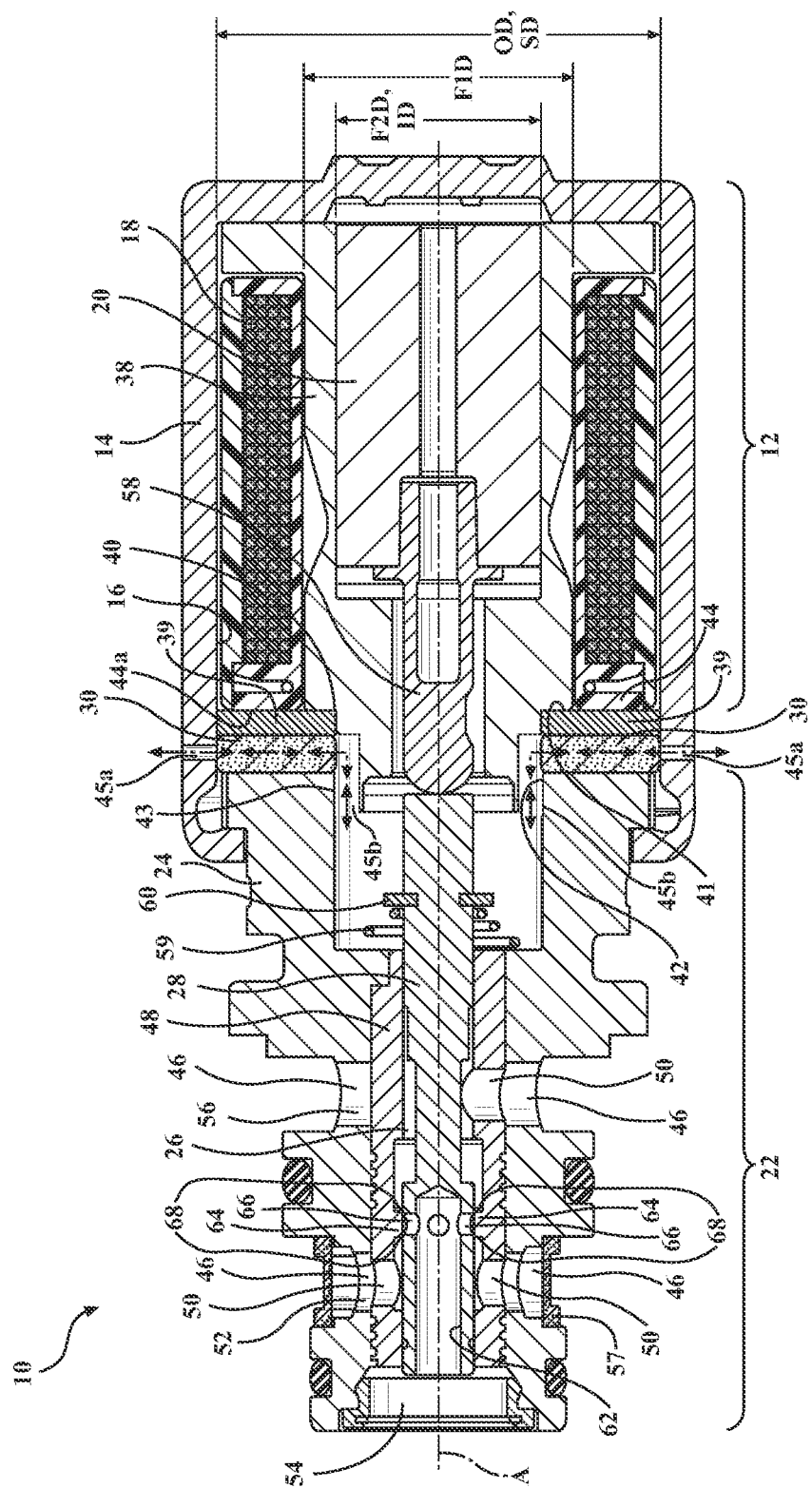
FIG. 3 is a cross-sectional view of another embodiment of the solenoid-actuated valve, with a flux core defining a flux fluid passage and the solenoid housing defining a housing fluid passage.
Figure 5:
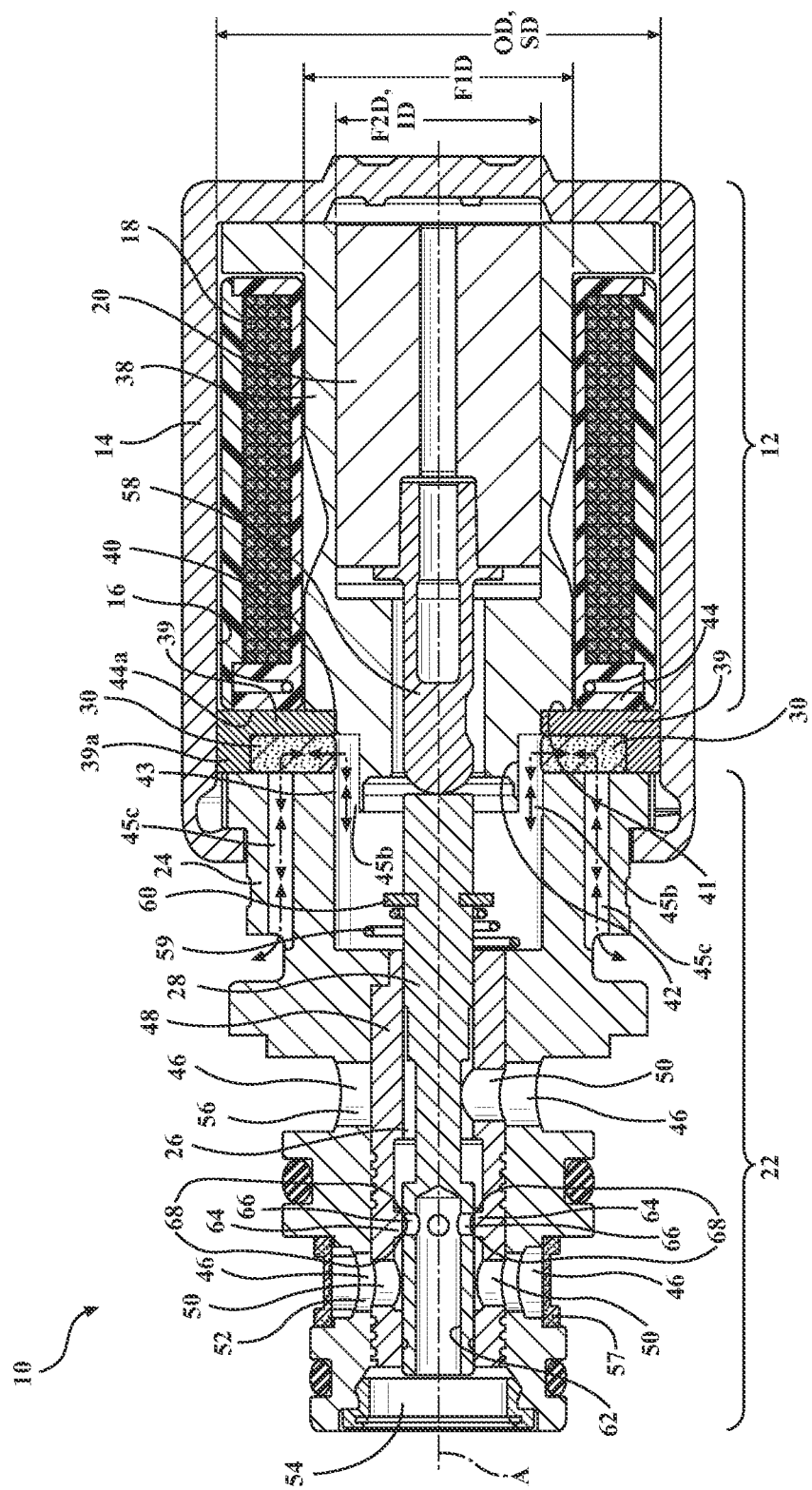
FIG. 5 is a cross-sectional view of another embodiment of the solenoid-actuated valve, with the flux core defining the flux fluid passage and the valve body defining the valve fluid passage.

As shown in FIGS. 1-3 and 5, the flux core 38 may define a flux fluid passage 45*b* for directing hydraulic fluid to flow into and out of the solenoid interior 16 upon actuation of the armature 20. In one embodiment, as shown in FIGS. 1-3, when both the housing fluid passage 45*a* and the flux fluid passage 46*b* are present, upon actuation of the armature 20, the hydraulic fluid is able to flow from the solenoid interior 16, through the flux fluid passage 45*b*, through the filter 30, through the housing fluid passage 45*a*, and into the hydraulic circuit 36, and is able to flow from the hydraulic circuit 36, through the housing fluid passage 45*a*, through the filter 30, through the flux fluid passage 45*b*, and into the solenoid interior 16. It is to be appreciated that the flux fluid passage 45*b* may be defined through the flux core 38 at any angle relative to the longitudinal axis A, such as 45 degrees, perpendicular to, or parallel to, such that the hydraulic fluid flows into and out of the solenoid interior 16. As shown in FIGS. 3 and 5, the flux fluid passage 45*b* may be defined as a notch in the flux core 38.

Figure 7:
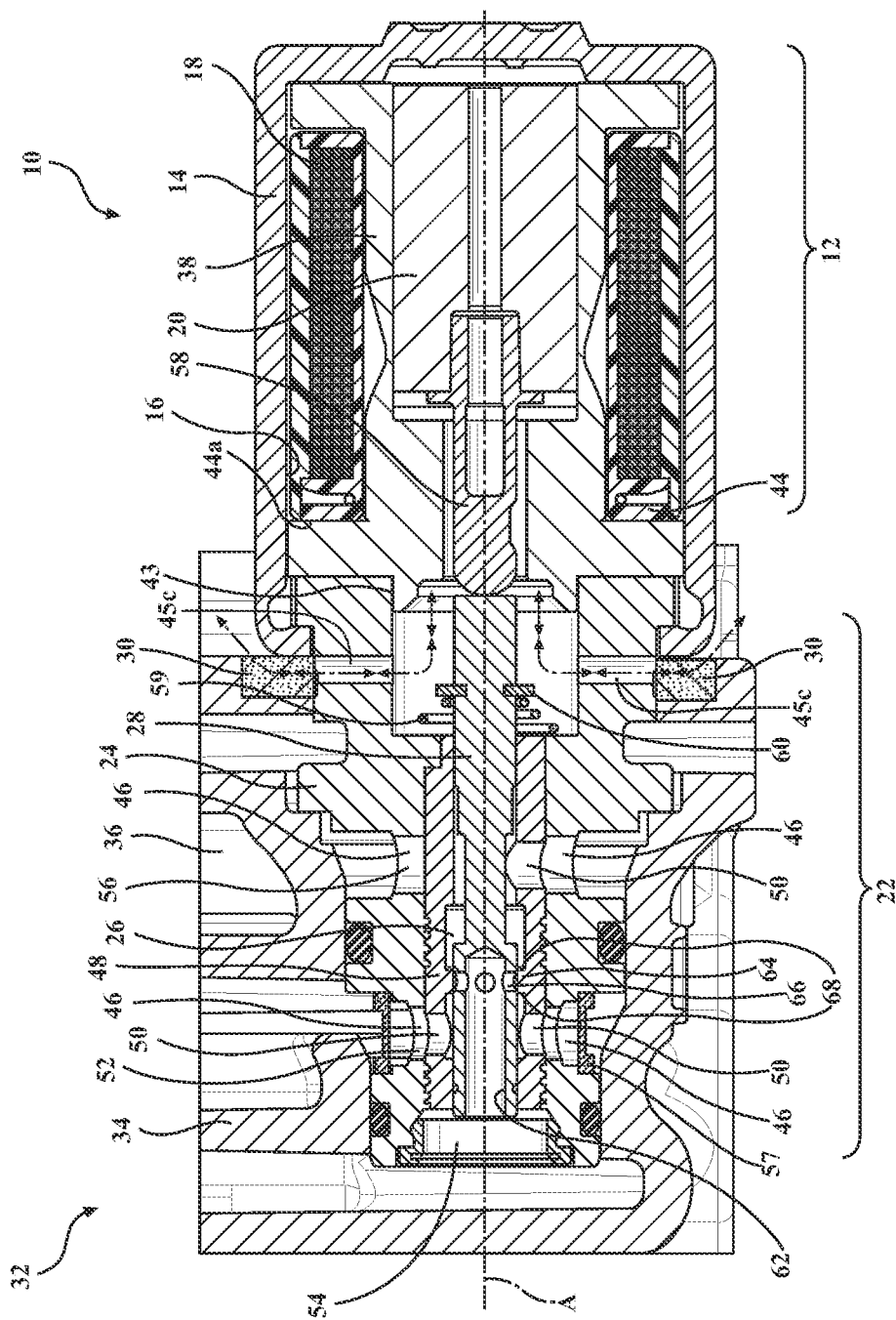
FIG. 7 is a cross-sectional view the hydraulic control module including another embodiment of the solenoid-actuated valve, with the valve filter being sandwiched between and coupled to the solenoid housing and the valve housing, and with the valve body defining the valve fluid passage.

With reference to FIG. 7, the valve filter 30 may be configured to be sandwiched between and coupled to the solenoid housing 14 and the valve housing 34. In some embodiments, the valve filter 30 may be configured to be sandwiched between and directly engaged with the solenoid housing 14 and the valve housing 34. It is to be appreciated that the valve filter 30 may be configured to be sandwiched between and coupled to the solenoid housing 14 and the valve housing 34 in embodiments where the valve body 24 is not present.

Figure 8:
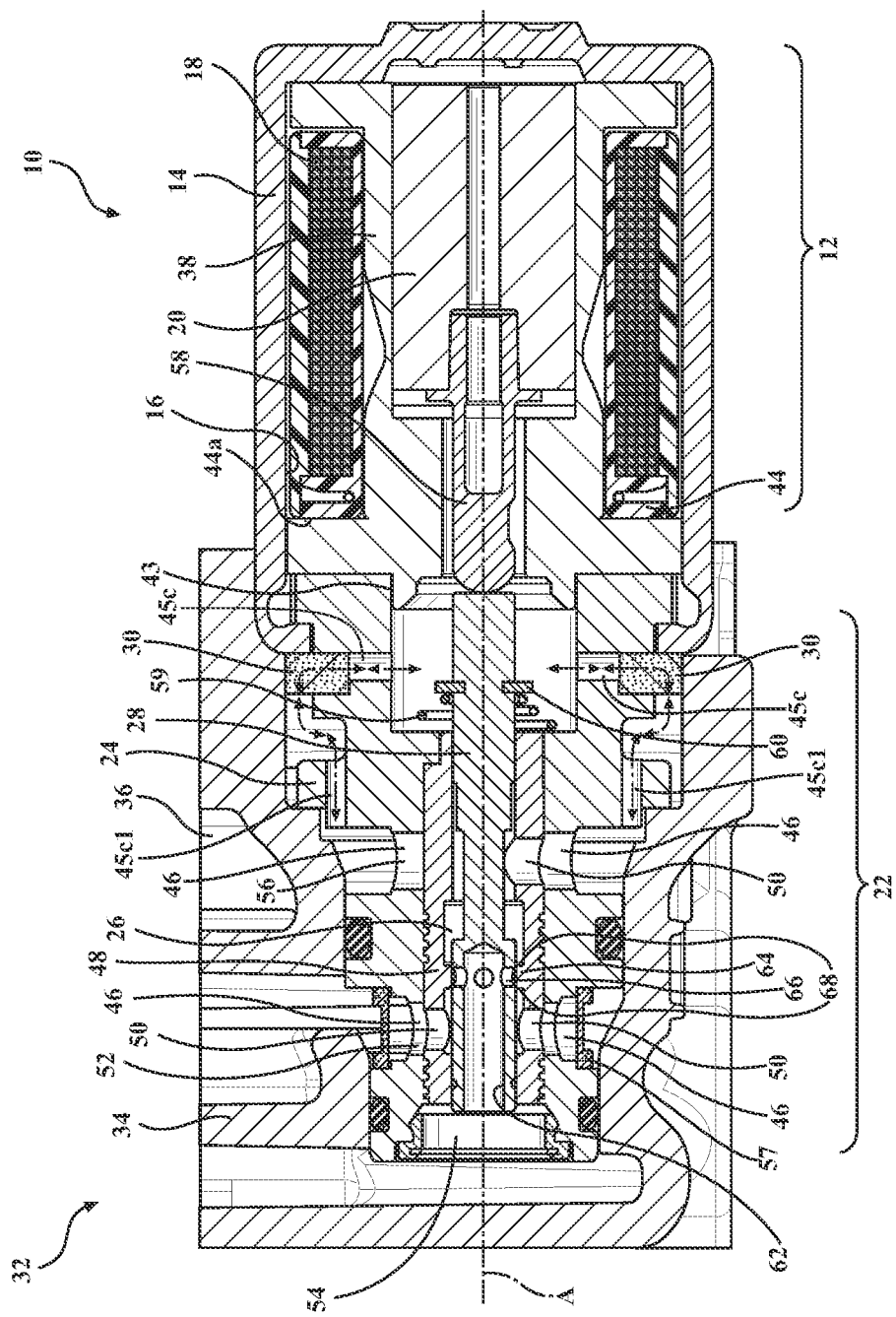
FIG. 8 is a cross-sectional view of the hydraulic control module including another embodiment of the solenoid-actuated valve, with the valve filter being sandwiched between and coupled to the solenoid housing and the valve body, and with the valve body defining the valve fluid passage and a second valve fluid passage.
Figure 9:
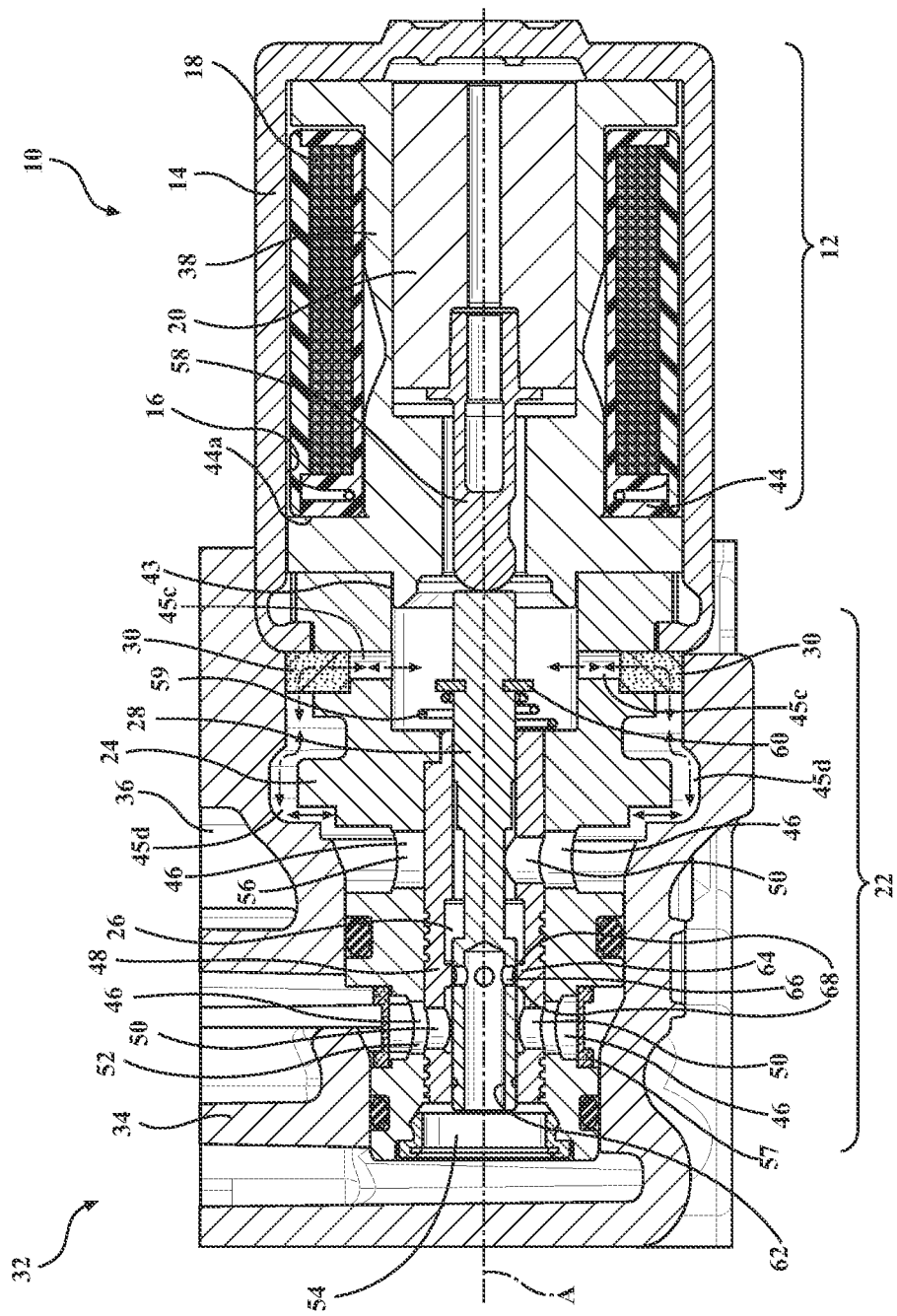
FIG. 9 is a cross-sectional view of the hydraulic control module including another embodiment of the solenoid-actuated valve, with the valve filter being sandwiched between and coupled to the valve body and the valve housing, with the valve body defining the valve fluid passage, and with the valve housing defining a valve housing fluid passage.

With reference to FIGS. 8 and 9, the valve filter 30 may be configured to be sandwiched between and coupled to the solenoid housing 14 and the valve body 24. It is to be appreciated that the valve filter 30 may be configured to be coupled to the solenoid housing 14, the valve housing 34, and the valve body 24. It is also to be appreciated that the valve filter 30 may be configured to be directly engaged with the solenoid housing 14, the valve housing 34, and the valve body 24.

Figure 4:
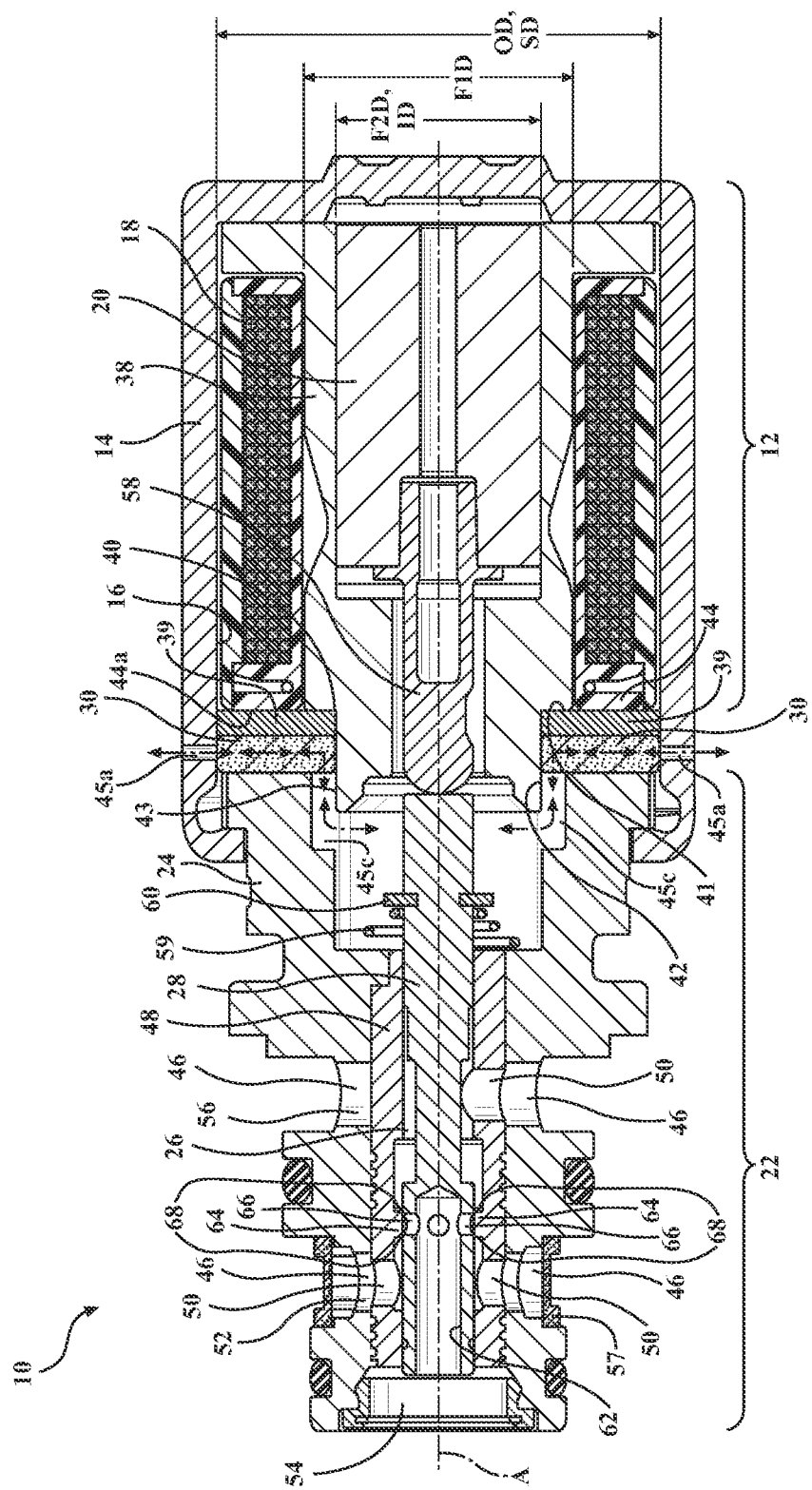
FIG. 4 is a cross-sectional view of another embodiment of the solenoid-actuated valve, with the valve body defining a valve fluid passage and the solenoid housing defining the housing fluid passage.

As also shown in FIGS. 4 and 7-9, the valve body 24 may define a valve fluid passage 45*c* adapted to be fluidly coupled to the hydraulic circuit 36 and the solenoid interior 16 for allowing the hydraulic fluid to flow into and out of the solenoid interior 16 upon actuation of the armature 26. As shown in FIG. 4, the valve fluid passage 45*c* may be a notch defined in the valve body 24. As shown in FIGS. 7-9, the valve fluid passage 45*c* may be defined perpendicular to the longitudinal axis A and through the valve body 24. It is to be appreciated that the valve fluid passage 45*c* may be defined through the valve body 24 at any angle relative to the longitudinal axis A, such as 45 degrees, such that the hydraulic fluid flows into and out of the solenoid interior 16. When present, the valve fluid passage 45*c* allows the hydraulic fluid to flow into and out of the hydraulic circuit 36, through the valve filter 30, through the valve fluid passage 45*c*, and into and out of the solenoid interior 16, as indicated by the flow arrows in FIGS. 4, and 7-9.

In some embodiments, as shown in FIG. 8, the valve body 24 may define a second valve fluid passage 45*c*1 fluidly coupled to the hydraulic circuit 36 and the solenoid interior 16 for allowing the hydraulic fluid to flow into and out of the solenoid interior 16 upon actuation of the armature 26. Typically, in this embodiment, the valve fluid passage 45*c* is defined perpendicular to the longitudinal axis A such that the hydraulic fluid flows through the valve fluid passage 45 perpendicular to the longitudinal axis A, and the second valve fluid passage 45*c*1 is defined parallel to the longitudinal axis A such that the hydraulic fluid flows through the second valve fluid passage 45*c*1 parallel to the longitudinal axis A. It is to be appreciated that the second valve fluid passage 45*c*1 may be defined through the valve body 24 at any angle relative to the longitudinal axis A, such as 45 degrees, such that the hydraulic fluid flows the second valve fluid passage 45*c*1.

As shown in FIG. 9, the valve housing 34 may define a valve housing fluid passage 45*d*. In some embodiments, the valve housing fluid passage 45*d* is a notch, as shown in FIG. 8. When present, the valve housing fluid passage 45*d* allows the hydraulic fluid to flow into and out of the hydraulic circuit 36, through the valve housing fluid passage 45*d*, through the valve filter 30, through the valve fluid passage 45*c*, and into and out of the solenoid interior 16.

As shown in FIGS. 2 and 7-9, the valve body 24 may define a plurality of fluid ports 46 fluidly coupled to the hydraulic circuit 36. The plurality of fluid ports 46 may include a supply port 52, a control port 54, and an exhaust port 56. To help with controlling the hydraulic fluid through the fluid passage 26, the valve portion 22 may further comprise an insert 48 disposed in the fluid passage 26 and about the longitudinal axis A, with the insert 48 further defining the fluid passage 26, and with the valve member 28 being slidable in the insert 48. In some embodiments, the valve member 28 may be further defined as a spool valve member. Typically, the insert 48 is comprised of metal. The insert 48 may define a plurality of apertures 50 fluidly coupled to the plurality of fluid ports 46. The plurality of fluid ports 46 and the plurality of apertures 50 may be machined. The plurality of apertures 50 are configured to align with the plurality of fluid ports 46. The valve portion 22 of the solenoid-actuated valve 10 may include a filter screen 57 coupled to the valve body 24 for filtering they hydraulic fluid flowing into the fluid passage 26 through the supply port 52.

To prevent over-compression of the valve filter 30, the valve body 24 may have a valve body protruding portion 24*a*, as shown in FIG. 2. When present, the valve body protruding portion 24*a* may extend toward the longitudinal axis A, with the valve body protruding portion 24*a* coupled to the flux core 38 to prevent movement of the flux core 38 along the longitudinal axis A, which may cause over-compression of the valve filter 30 if the flux core 38 were to move along longitudinal axis A. In some embodiments, the valve body protruding portion 24*a* may directly engage the flux core 38. As shown in FIG. 5, the washer 39 may have a washer protruding portion 39*a*. When present, the washer protruding portion 39*a* may extend along the longitudinal axis A, with the washer protruding portion 39*a* coupled to the valve body 24 to prevent movement of the valve body 24 and/or flux core 38 along the longitudinal axis A, which may cause over-compression of the valve filter 30 if the valve body 24 and/or flux core 38 were to move along the longitudinal axis A. In some embodiments, the washer protruding portion 39*a* may directly engage the valve body 24. As shown in FIG. 6, the flux core 38 may have a flux core protruding portion 28*a*, as shown in FIG. 6. When present, the flux core protruding portion 38*a* may extend along the longitudinal axis A, with the flux core protruding portion 38*a* coupled to the solenoid housing 14 to prevent movement of the flux core 38 and/or solenoid housing 14 along the longitudinal axis A, which may cause over-compression of the valve filter 30 if the flux core 38 and/or the solenoid housing 14 were to move along longitudinal axis A. In some embodiments, the flux core protruding portion 38a may be directly engaged with the solenoid housing 14.

To control hydraulic fluid through the fluid passage 26, the armature 20 may be configured to contact the valve member 28 to cause the valve member 28 to slide in the fluid passage 26. In some embodiments, the solenoid portion 12 may include an armature pin 58, with the armature pin 58 being coupled to the armature 20 and configured to contact the valve member 28. To bias the armature 20 along the longitudinal axis, the solenoid-actuated valve 10 may include a biasing member 59. In one embodiment, the valve portion 22 includes the biasing member 59, with the biasing member 59 being coupled to the valve member 28 and the valve body 24. The valve member 28 may include a biasing seat 60, with the biasing member 59 engaged with the biasing seat 60 and the valve body 24. When present, the biasing member 59, along with the energization of the coil 18, controls movement of the valve member 28 along the longitudinal axis A to control the flow of hydraulic fluid through the fluid passage 26 and, in turn, the hydraulic circuit 36.

When the valve member 28 slides in the fluid passage 26, hydraulic fluid is directed through the plurality of fluid ports 46 and the plurality of apertures 50. In some embodiments, the valve member 28 defines a fluid bore 62 along the longitudinal axis A. When present, the fluid bore 62 directs fluid to and from the supply port 52, the control port 54, and the exhaust port 56.

To further help control the flow of hydraulic fluid, the insert 48 may have a metering land 64, and the valve member 28 may define a metering orifice 66. When present, the metering land 64 alignable with the metering orifice 66 to control the flow of hydraulic fluid through the metering orifice 66 when the valve member 28 is positioned such that the metering orifice 66 is aligned with the metering land 64. It is to be appreciated that, alternatively, the insert 48 may have more than one metering land 64, and the valve member 28 may define more than one metering orifice 66. It is also to be appreciated that the valve member 28 may have one or more metering lands 64, and that the insert 48 may define one or more metering orifices 66. The metering land 64 may have metering edges 68 for permitting the flow of hydraulic fluid through the metering orifice 66 when the valve member 28 is moved along the longitudinal axis A.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A solenoid-actuated valve comprising:
   a solenoid portion extending along a longitudinal axis, with said solenoid portion comprising,
      a solenoid housing disposed about said longitudinal axis and defining a solenoid interior,
      a coil disposed about said longitudinal axis and in said solenoid interior, and
      an armature disposed about said longitudinal axis and in said solenoid interior and between said longitudinal axis and said coil, with said armature being moveable along said longitudinal axis in response to energization of said coil;
   a valve portion coupled to said solenoid portion and comprising,
      a valve member moveable by said armature for controlling a flow of hydraulic fluid through a hydraulic circuit; and
   a valve filter disposed in said solenoid interior and/or coupled to said solenoid housing and configured to separate said solenoid interior from a hydraulic circuit when said valve portion is coupled to a valve housing for allowing the hydraulic fluid to flow into and out of said solenoid interior upon actuation of said armature;
   wherein said solenoid housing defines a housing fluid passage for directing the hydraulic fluid to flow into and out of said solenoid interior upon actuation of said armature; and
   wherein said valve portion further comprises a valve body disposed about said longitudinal axis and defining a fluid passage, with said valve member disposed in said fluid passage for controlling the flow of hydraulic fluid through the hydraulic circuit, wherein said solenoid housing has a first housing end adjacent said valve body, and a second housing end spaced from said first housing end along said longitudinal axis, and wherein said housing fluid passage is defined at said second housing end.

2. The solenoid-actuated valve as set forth in claim 1, wherein said valve body defines a valve fluid passage adapted to be fluidly coupled to the hydraulic circuit and said solenoid interior for allowing the hydraulic fluid to flow into and out of said solenoid interior upon actuation of said armature.

3. The solenoid-actuated valve as set forth in claim 1, wherein said solenoid portion further comprises a flux core disposed in said solenoid interior about said longitudinal axis.

4. The solenoid-actuated valve as set forth in claim 3, wherein said flux core defines a flux fluid passage for directing hydraulic fluid to flow into and out of said solenoid interior upon actuation of said armature.

5. The solenoid-actuated valve as set forth in claim 3, wherein said valve filter is disposed at said second housing end, and coupled to said flux core and said solenoid housing.

6. The solenoid-actuated valve as set forth in claim 3, wherein said valve filter is sandwiched between and directly engaged with said solenoid housing and said flux core.

7. The solenoid-actuated valve as set forth in claim 3, wherein said valve filter is disposed between said flux core and said valve body.

8. The solenoid-actuated valve as set forth in claim 3, wherein said valve filter is disposed between said flux core and said valve housing.

9. The solenoid-actuated valve as set forth in claim 1, wherein said valve filter is directly engaged with said solenoid housing.

10. The solenoid-actuated valve as set forth in claim 1, wherein said valve filter is stationary with respect to said solenoid housing during actuation of said armature.

11. The solenoid-actuated valve as set forth in claim 1, wherein said valve filter is a felt filter.

12. A hydraulic control module comprising:
   said solenoid-actuated valve as set forth in claim 1; and
   a valve housing defining a hydraulic circuit.

13. A solenoid-actuated valve comprising:
   a solenoid portion extending along a longitudinal axis, with said solenoid portion comprising,
      a solenoid housing disposed about said longitudinal axis and defining a solenoid interior, a coil disposed about said longitudinal axis and in said solenoid interior, and an armature disposed about said longitudinal axis and in said solenoid interior and between said longitudinal axis and said coil, with said armature being moveable along said longitudinal axis in response to energization of said coil;

a valve portion coupled to said solenoid portion and comprising, a valve member moveable by said armature for controlling a flow of hydraulic fluid through a hydraulic circuit; and a valve filter disposed in said solenoid interior and/or coupled to said solenoid housing and configured to separate said solenoid interior from a hydraulic circuit when said valve portion is coupled to a valve housing for allowing the hydraulic fluid to flow into and out of said solenoid interior upon actuation of said armature;

wherein said solenoid portion further comprises a flux core disposed in said solenoid interior about said longitudinal axis; and wherein said valve filter is sandwiched between and directly engaged with said solenoid housing and said flux core.

14. The solenoid-actuated valve as set forth in claim 13, wherein said valve filter is stationary with respect to said solenoid housing during actuation of said armature.

15. The solenoid-actuated valve as set forth in claim 13, wherein said solenoid housing has a first housing end adjacent said valve body, and a second housing end spaced from said first housing end along said longitudinal axis, wherein said valve filter is disposed at said second housing end.

16. The solenoid-actuated valve as set forth in claim 15, wherein said flux core defines a corner adjacent said second housing end, and wherein said valve filter is disposed in said corner.

17. The solenoid-actuated valve as set forth in claim 13, wherein said valve filter is a felt filter.

18. A hydraulic control module comprising:
said solenoid-actuated valve as set forth in claim 13; and
a valve housing defining a hydraulic circuit.

19. A solenoid-actuated valve comprising:
a solenoid portion extending along a longitudinal axis, with said solenoid portion comprising,
a solenoid housing disposed about said longitudinal axis and defining a solenoid interior,
a coil disposed about said longitudinal axis and in said solenoid interior, and
an armature disposed about said longitudinal axis and in said solenoid interior and between said longitudinal axis and said coil, with said armature being moveable along said longitudinal axis in response to energization of said coil;

a valve portion coupled to said solenoid portion and comprising, a valve member moveable by said armature for controlling a flow of hydraulic fluid through a hydraulic circuit; and a valve filter disposed in said solenoid interior and/or coupled to said solenoid housing and configured to separate said solenoid interior from a hydraulic circuit when said valve portion is coupled to a valve housing for allowing the hydraulic fluid to flow into and out of said solenoid interior upon actuation of said armature;

wherein said solenoid portion further comprises a flux core disposed in said solenoid interior about said longitudinal axis;

wherein said valve portion further comprises a valve body disposed about said longitudinal axis and defining a fluid passage, with said valve member disposed in said fluid passage for controlling the flow of hydraulic fluid through the hydraulic circuit, and wherein said valve filter is disposed between said flux core and said valve body; and wherein said flux core defines a corner, with said valve filter being disposed in said corner such that said valve filter is disposed between said valve body and said flux core.

20. The solenoid-actuated valve as set forth in claim 19, wherein said flux core and said valve body collectively define a pocket about said longitudinal axis for securing said valve filter.

21. The solenoid-actuated valve as set forth in claim 19, wherein said valve filter is stationary with respect to said solenoid housing during actuation of said armature.

22. The solenoid-actuated valve as set forth in claim 19, wherein said valve filter is a felt filter.

23. A hydraulic control module comprising:
said solenoid-actuated valve as set forth in claim 19; and
a valve housing defining a hydraulic circuit.

* * * * *